United States Patent [19]
McKinney

[11] Patent Number: 5,740,784
[45] Date of Patent: Apr. 21, 1998

[54] FUEL CONTROL SYSTEM

[75] Inventor: Mark McKinney, Irmo, S.C.

[73] Assignee: Pleasurecraft Marine Engine Co., Little Mountain, S.C.

[21] Appl. No.: 450,698

[22] Filed: May 25, 1995

[51] Int. Cl.$^6$ .................................................. F02M 37/04
[52] U.S. Cl. ........................ 123/509; 123/514; 123/510
[58] Field of Search ........................... 123/504, 510, 123/514, 516, 447

[56] References Cited

U.S. PATENT DOCUMENTS

| | | | |
|---|---|---|---|
| 1,189,096 | 6/1916 | Grunwald | 123/514 |
| 3,796,518 | 3/1974 | Weaver . | |
| 4,296,723 | 10/1981 | Aldrich | 123/510 |
| 4,372,847 | 2/1983 | Lewis | 123/510 |
| 4,795,556 | 1/1989 | Brotea | 123/510 |
| 4,860,713 | 8/1989 | Hodgkins | 123/510 |
| 4,979,482 | 12/1990 | Bartlett | 123/510 |
| 5,009,575 | 4/1991 | Hanai et al. . | |
| 5,036,822 | 8/1991 | Kojima . | |
| 5,050,567 | 9/1991 | Suzuki . | |
| 5,058,557 | 10/1991 | Frank et al. . | |
| 5,096,391 | 3/1992 | Tuckey . | |
| 5,103,793 | 4/1992 | Riese | 123/509 |
| 5,146,901 | 9/1992 | Jones . | |
| 5,307,782 | 5/1994 | Davis | 123/510 |
| 5,315,968 | 5/1994 | Niebrzydoski . | |
| 5,355,860 | 10/1994 | Erstam | 123/510 |
| 5,363,827 | 11/1994 | Siekmann . | |
| 5,368,001 | 11/1994 | Roche | 123/510 |

Primary Examiner—Carl S. Miller
Attorney, Agent, or Firm—Vorys, Sater Seymour & Pease

[57] ABSTRACT

A fuel control system is provided. Fuel is delivered into a main canister from a low-pressure pump, where it gathers in a reservoir or bottom area. The fuel in the reservoir is taken up by a small high-pressure pump inside the housing, which drives the fuel to the fuel injectors of an engine. The low-pressure pump has a flow rate exceeding that of the high-pressure pump. A vapor trap captures accumulating fuel vapor. Volumetric excess fuel and vapor are vented back to the fuel tank and atmospheric pressure. Vapor lock is reduced or avoided, and particulate and water filters are provided to avoid contamination.

13 Claims, 5 Drawing Sheets

FUEL CONTROL SYSTEM

FIELD OF THE INVENTION

The invention relates to a fuel control system, particularly to a fuel control system for regulation of the flow of fuel to engines.

BACKGROUND OF THE INVENTION

Engines of all types require a smooth supply of fuel to ensure reliable operation. When the flow of fuel is interrupted, cut off, reduced, contaminated or impaired in other ways, the leanness of mix, combustion efficiency, temperature, degree of pollutive byproducts as well as basic engine output and other performance aspects can all be affected.

The problem of a compromised fuel supply is an issue under a variety of conditions. One such condition occurs when the engine develops a high temperature in its components. This can occur for example in marine engine systems, particularly fuel-injected systems, when an engine is run for a while and reaches operating temperature, and then is shut off. In this situation, the components in the engine box, including fuel delivery parts such as pumps, hoses, fuel injector rails and fuel injectors reach a high operating temperature. This can be worsened when the engine and other components are exposed to a hot sun.

When fuel that is located inside of a fuel line, engine part or other crucial component reaches a high enough temperature for enough time under those conditions, the fuel can vaporize. This can happen in a parked boat, but can also occur in automotive and other vehicle engines, as well as in industrial engine applications. The interruption of fuel flow due to the process of developing pockets of vapor is known as "vapor lock".

The trapped volume of vapor impedes the flow of fuel by infiltrating the fuel pump, which delivers fuel to fuel injectors. After the vapor volume enters the fuel pump, the pump may not be able re-establish a prime on the fuel. Vapor pockets can also congregate around fuel filters, water separators and other components. When vapor lock occurs, it is usually difficult or impossible to restart the engine at the time of the failure. The engine and other components must be permitted to cool down to condense the vapor pocket, the pocket must be bled off, the pump must be re-primed, and/or other measures must be taken to supply the engine with fuel again. This is a problem for boats on the water, as well as other situations.

Engine systems are susceptible to a number of other fuel supply difficulties. One is air ingestion. When a vehicle rocks or turns violently, as may happen in a banking boat and other situations, the fuel in the fuel tank or tanks can slosh and shift, causing air bubbles to form and enter the fuel line. Air can also enter an engine system when the fuel in a fuel tank runs low, and the pickup tube begins to draw air. However formed, when an air pocket enters a fuel injector or other engine part, the engine can stall and be damaged. Even when an air pocket is passed through the system without direct damage, the components can overheat because liquid fuel normally acts as a coolant.

Engines of different types are also vulnerable to fuel which is contaminated by rust, grit, dust or other particles, which cause abrasion to the engine and other parts. Engines are also susceptible to problems from water entering the fuel line. Fuel pumps and electronic fuel injectors can tolerate only a small percentage of water contamination, and will eventually fail from water exposure. Water, being denser than fuel, can also fall into the bottom of tanks, pumps and other parts and block the passage of fuel entirely. Water can get into the fuel supply by condensation inside the fuel tank, particularly under humid conditions, may be present in fuel when the tank is supplied, or can originate in other ways.

Engines, marine and other, are therefore subject to a variety of fuel supply problems that can degrade performance. Attempts have been made to insulate the engine from those types of problems. U.S. Pat. No. 5,368,001 to Roche for instance discloses a marine fuel system with a cylindrical body (26) fed by a low-pressure pump. The body contains a small pump (24), which gathers the fuel, under valve and float control, and delivers it under pressure to a fuel injector. Fuel vapors caught in the top (36) of the body are routed back to the engine for burning, or bled off into an absorbing filter.

While a system like that illustrated in U.S. Pat. No. 5,368,001 can help to regulate and to some extent filter the flow of fuel to an engine, certain difficulties with a fuel system of that type remain. For one, that system admits fuel into the reservoir only under control of an inlet valve (50) combined with a float (62), and other mechanical components. The presence of those components subtract from the flexibility and reliability of that system. Any valve, float or other mechanical component can become stuck, when clogged with debris or otherwise. Moreover, such components are typically made of some type of metal, which wears and oxidizes over time and eventually requires removal, cleaning or replacement. Sharp physical impact can also cause mechanical parts to malfunction.

In addition, in a fuel system like that of U.S. Pat. No. 5,368,001 excess vapor does not always vent to atmosphere, instead reaching the engine or an absorbing filter so that vapor pressure is not directly dispersed. Also, the system is not free-running, and relies upon mechanical valving to meter flow on and off during certain circumstances. When the inlet valve (50) of that system is closed, the pump may not reprime until the pressure is relieved. Moreover, in the event of a pump failure in a fuel system like that of U.S. Pat. No. 5,368,001, the excess pressure would be expelled through the vapor vent circuit and ingested into the engine. The resulting surge of extra fuel into the intake manifold would flood, and possibly stall, the engine. Other systems attempt to address different problems of engine fuel supply performance, but not in a complete or satisfactory way.

SUMMARY OF THE INVENTION

It is accordingly an object of the invention to provide a fuel control system which overcomes these and other problems of the art, in an efficient, reliable delivery system.

It is another object of the invention to provide a fuel control system which prevents the occurrence of vapor lock under a wide variety of conditions.

It is another object of the invention to provide a fuel control system which is relatively compact, easy to service and maintain.

It is another object of the invention to provide a fuel control system which eliminates or reduces mechanical parts.

It is another object of the invention to provide a fuel control system which filters water and particles out of the fuel being regulated.

It is another object of the invention to provide a fuel control system which reduces the onset and degree of heat soaking.

It is another object of the invention to provide a fuel control system which produces a fuel supply steady enough to make the engine resistant to stalling and other problems.

The invention achieving these and other objects is a fuel control system having a generally elongated, cylindrical main body or canister which contains fuel pumping and treating elements. The main canister receives fuel from a low-pressure pump, and takes the fuel up into an internal small high-pressure pump which in turn delivers the fuel to fuel injectors of an engine. A vapor trap at the top of the main canister captures accumulating fuel vapor, from which area the vapor is vented to the fuel tank, and atmospheric pressure.

The fuel control system of the invention provides a water filter for removing water from the fuel, as well as other features to help control and regulate the fuel supply to the engine in a smooth, steady manner while eliminating or reducing water, vapor and other contamination and difficulties.

BRIEF DESCRIPTION OF THE DRAWINGS

The invention will be described with reference to the drawings, in which like parts are labelled with like numbers. The drawings are briefly described below.

DETAILED DESCRIPTION OF THE DRAWINGS

Figure 1:
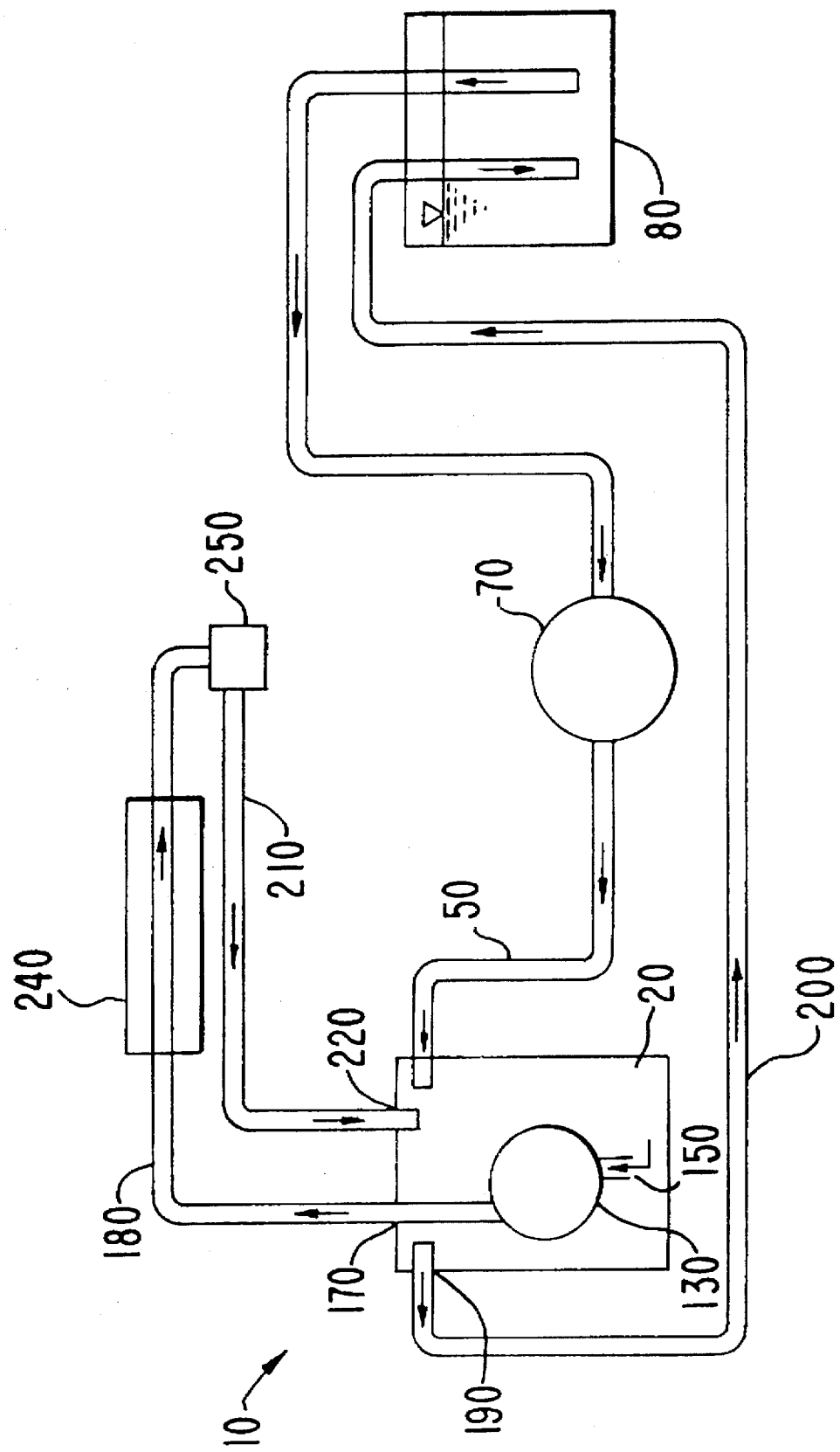
FIG. 1 illustrates the fuel control system of the invention, in a general flow diagram.
Figure 2:
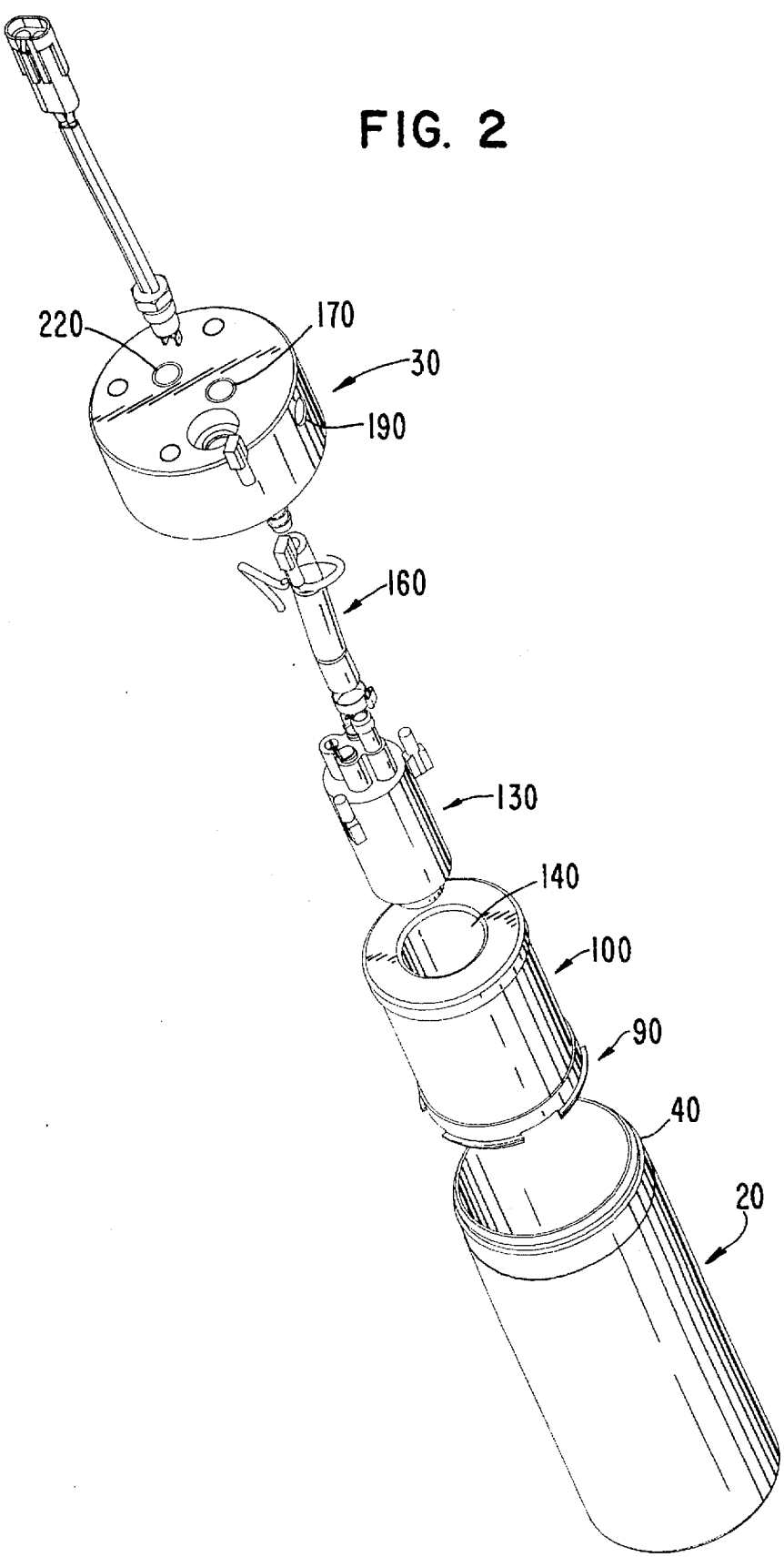
FIG. 2 illustrates the canister member of the fuel control system of the invention, in exploded view.

A preferred embodiment of the invention is illustrated in FIGS. 1-5. This embodiment is a fuel control system 10 having a main housing or canister 20, the main canister 20 being generally cylindrical in shape. The main canister 20 may be made of any suitable material, such as high-impact plastic, aluminum or other materials. In terms of volume, the canister 20 in the illustrated embodiment can hold about 30 fluid ounces of fuel, but it will be appreciated that the fuel control system 10 can be manufactured to other capacities.

A manifold 30 is attached to the top of main canister 20 to receive fuel, electrical connections and other attachments. Manifold 30 is generally cylindrical in shape, and screws down with conventional screw grooves (not shown) onto main canister 20, into receiving threads 40. Manifold 30 receives fuel through a fuel supply hose 50, attached to manifold 30 at a fuel intake port 60.

The supply hose 50 is connected at the other end to a low-pressure supply pump 70, which in turn is connected by appropriate hosing or lines to a fuel tank (or tanks) 80. Supply pump 70 can be of any suitable known type. Supply pump 70 draws fuel from the fuel tank 80 at low pressure, but relatively high volume. Supply pump 70 then delivers the fuel to the main canister 20 for control.

Main canister 20 contains a number of internal components to develop a smooth, uninterrupted supply of fuel received through manifold 30 to the engine (not shown). Canister 20 encapsulates a cylindrical, concentric fuel filter assembly 90 in the bottom area of canister 20, to filter the fuel arriving in the canister. Fuel filter assembly 90 contains a filter element 100, which can be of any suitable known type, made of fiber, with baffled surfaces, or otherwise. Filter element 100 is preferable a 10 micron design. Filter element 100 acts to filter out particulate contaminants in the fuel, such as rust, dirt or other material.

Filter element 100 is also preferably treated with one or more water-repellant substances, such as silicone, to prevent water from arriving in the fuel eventually delivered to the engine. The main canister 20 is mounted vertically. Any water intruding in the fuel supply will therefore run to and accumulate in the bottom, in water trap basin 110 of canister 20, below the fuel filter and the high pressure pump (described below). Water collected in water trap basin 110 can be periodically drained by pulling drain plug 120. Preventing water from entering the fuel supply aids in the development of a safe, reliable fuel supply.

In terms of pumping the fuel so filtered in canister 20, fuel control system 10 incorporates a high-pressure pump 130 nested in a receiving cavity 140 in fuel filter assembly 90. High-pressure pump 130 in the illustrated embodiment may be an electronically driven, submersible unit, such as can be purchased from Walbro Engine Management Corp. High-pressure pump 130 receives electrical power from a positive/negative (±) wiring harness, which in turn connects into the main electrical chassis of the boat or other vehicle.

High-pressure pump 130 receives fuel arriving through the manifold 30 and descending through fuel filter assembly 90, which filters out water, particles and other contamination. The filtered fuel gathers in the bottom area of canister 20. High-pressure pump 130 takes the fuel up through an intake member 150 located in the cavity at the base of the pump. As noted, any water in the system is trapped in water trap basin 110, well beneath intake member 150. High-pressure pump 130 is consequently not primed with water, assuming drain plug 120 is drained when even occasionally necessary.

High-pressure pump 130 develops a relatively high head of pressure on the fuel that is taken up through intake member 150, as high as 45 psi according to the specifications of some fuel injector systems. High-pressure pump 130 transmits the fuel back out of canister 20 for delivery to the engine, at high pressure but relatively low volume. High-pressure pump 130 communicates with manifold 30 by means of a short, high-pressure output hose 160. Output hose 160 in turn is connected to an outlet port 170 on the upper deck of manifold 30, to which a fuel delivery hose 180 is attached.

The engine, in marine applications typically a fuel-injected system, receives the fuel so treated from delivery hose 180 of fuel control system 10. While supply pump 70 pumps at a relatively low pressure, it pumps at a high volume. The flow rate of supply pump 70 in the illustrated embodiment exceeds that of the smaller, high-pressure pump 130, which outputs a relatively small volume. Because the supply pump 70 delivers fuel to main canister 20 at a higher flow rate than high-pressure pump 130 evacuates it, the main canister 20 of fuel control system 10 fills with fuel, to the top. The excess or overdriven amount of fuel is relieved or vented out of vent port 190 at the top of manifold 30, which communicates with fuel tank return line 200. Excess canister fuel simply returns to the fuel tank (or tanks) 80 through fuel tank return line 200, in circulating fashion.

Because supply pump 70 never has to prime against a high system head pressure, the fuel control system 10 can be primed with fuel upon startup with little difficulty or delay.

Likewise, in terms of consumption of the controlled fuel, any excess unburned fuel coming through the fuel injectors 240 (schematically illustrated) of the engine may be routed back to fuel control system 10 by excess engine return line 210 through engine regulator 250 (schematically illustrated), where it enters the manifold through engine return intake port 220. The unburned, excess fuel recaptured in this manner mixes with the fuel arriving from the low-pressure supply pump 70, conserving fuel. The excess engine return line 210 also helps maintain a consistent pressure across the fuel delivery system.

Figure 3:
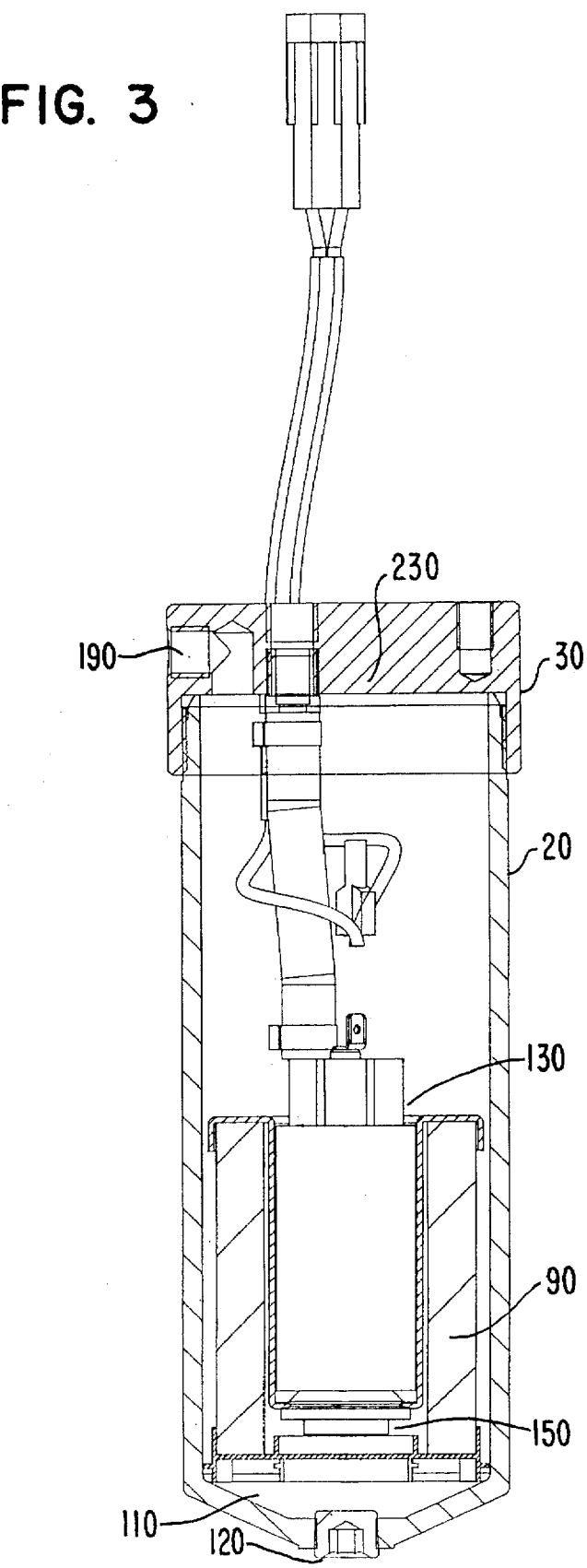
FIG. 3 illustrates the canister member of the fuel control system of the invention, in cutaway side view.
Figure 4:
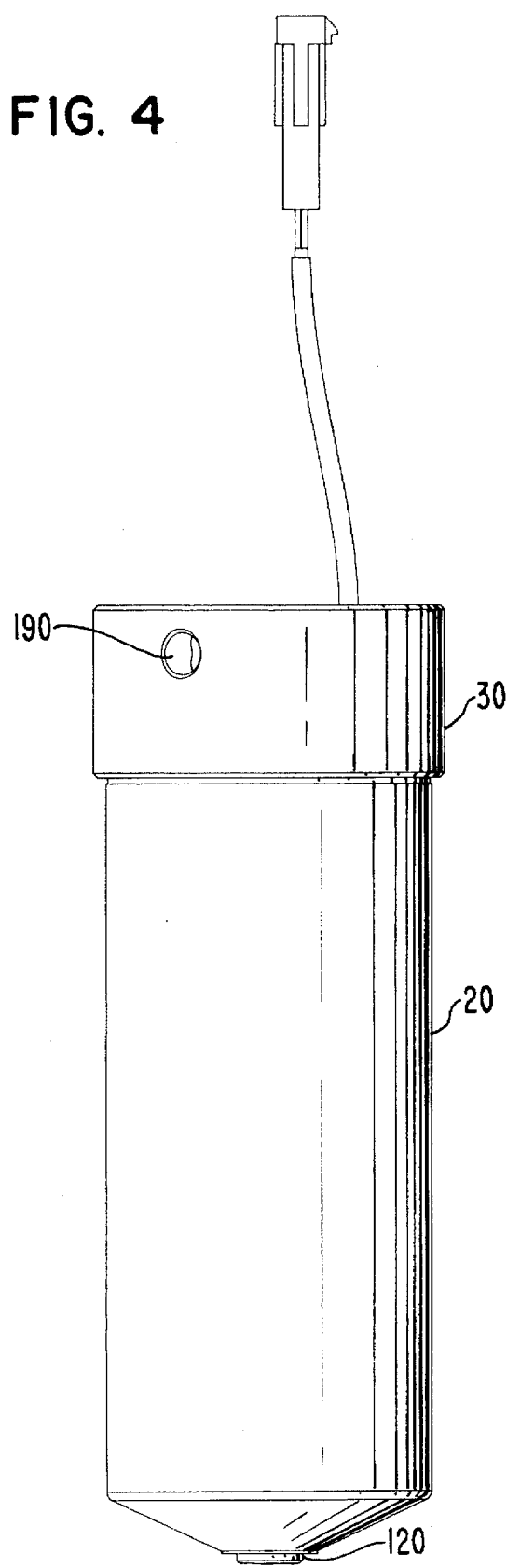
FIG. 4 illustrates the canister member of the fuel control system of the invention, in side view.
Figure 5:
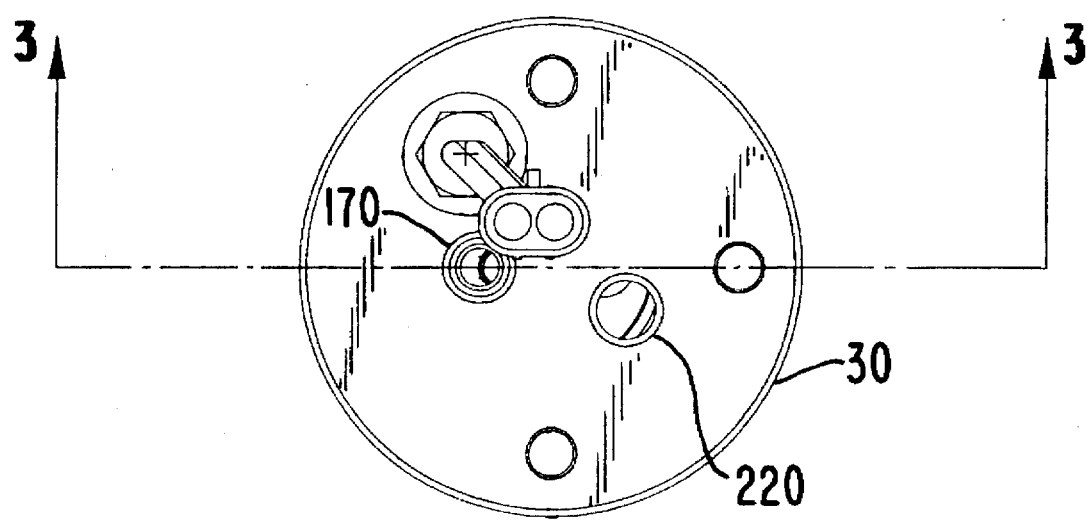
FIG. 5 illustrates the canister member of the fuel control system of the invention, in top view.

Fuel control system 10 also includes a vapor trap area 230, in the area of manifold 30 attached to the upper section of canister 20, as illustrated in FIG. 3. When main canister 20 and high-pressure pump 130 are fed fuel by low-pressure supply pump 70, that fuel gathers in the bottom of canister 20, but fills the canister 20 up to the top. Should high operating temperatures or other conditions cause the formation of fuel vapor within canister 20, it rises to and occupies the vapor trap area 230. The accumulating vapor disperses by venting out through vent port 190, in the illustrated embodiment a circular aperture in the sidewall of manifold 30, exiting along with excess fuel to fuel tank return line 200, and atmospheric pressure. In this manner, vapor pockets are safely and reliably removed from the fuel control system 10, and away from engine intake.

As will be appreciated from the foregoing, the fuel supply delivered by the fuel control system 10 of the invention is steady, well-regulated, cleansed of air, vapor and other contaminants. Because of the cleansing action of fuel filter assembly 90, the fuel arriving at the engine is generally free of particulate and water contamination. Because the main canister 20 contains a relatively large volume of fuel which is continually being resupplied by the supply pump 70 and excess engine return line 210, the fuel control system 10 is not prone to sloshing and ingesting air pockets. An adequate fuel flow for starting, idle, cruise and acceleration is therefore provided.

The fuel control system 10 of the invention consequently drives, controls and is connected to two overall fuel flow loops: to the engine and back (returning excess via excess engine return line 180), and to the system 10 with volumetric excess venting back to the fuel tank (or tanks, via the vent port 190 and fuel tank return line 200).

Resistance to vapor lock, air ingestion, and other gaseous supply problems in fuel control system 10 is greatly enhanced. Because fuel vapor, air and other contaminants are relieved through vent 190 port of the fuel control system 10 back to atmospheric pressure through the fuel tank return line 200, the system 10 is much less prone to air clogging, vapor lock and other problems under a host of conditions that would hamper prior art systems. This is accomplished without the need for valving or other mechanical apparatus, and a steady supply of fuel reaches the engine, even in violent boat or other maneuvers.

Moreover, the relatively high volume of fuel in main canister 20 means that the temperatures required to and heat soaking required to trigger vapor lock will not build up as quickly as in some other, smaller engine parts, which can do so in 1–2 hours. In addition, the relatively high volume of fuel in canister 20 provides a buffer of fuel, in the event that the fuel pickup tube in the tank begins to draw air when fuel is depleted. This permits a boat manufacturer to use a standard fuel tank, rather than one built with baffles and a sump, adding to cost.

In addition, because the fuel control system 10 is continuously being supplied with a volume of fuel from supply pump 70 which exceeds the flow rate of the high-pressure pump 130, canister 20 is always easy to prime and keep filled with fuel. Excess fuel in canister 20 built up because of the differential in flow rates of the pumps is circulated back to the fuel tank, by way of vent port 190 and fuel tank return line 200. In this manner, a smoothly circulating flow of fuel to the engine is steadily maintained. The fuel control system 10 of the invention is capable of delivering a fuel flow adequate to supply engines including 2 or 4 stroke designs, marine inboard or outboard, 8 cylinders (or more) if desired.

These advantages are accomplished in a compact, efficient system with few moving parts which is easy and convenient to manufacture, to install, and for the user to disassemble when necessary. A user need simply unscrew manifold 30, for instance, to replace filter element 100. This is unlike, say, a more complicated fuel system like that of U.S. Pat. No. 5,368,001 which appears difficult to disassemble, and relies upon valves, floats and other mechanical parts susceptible to wear, failure and corrosion to turn fuel intake on and off, to losing priming effects under turbulent conditions, and other disadvantages. That illustrated system is hence basically discontinuous in nature, with flow metered on and off by those parts, unlike the invention with a continuous smooth flow.

The foregoing description of the fuel control system of the invention is illustrative, and variations on certain aspects of the inventive system will occur to persons skilled in the art. The scope of the invention is accordingly intended to be limited only by the following claims.

What is claimed is:

1. A fuel control system for controlling fuel delivered to an engine, comprising:

a supply pump having a fuel flow rate;

a first fuel delivery conduit connecting the supply pump to a fuel tank; a canister, having a generally closed interior;

a second fuel delivery conduit connecting said supply pump and said canister for supplying fuel from said supply pump to the interior of the canister, a high-pressure pump including a fuel uptake means, located within said canister and connected to an outlet port in the canister, and having a fuel flow rate which is lower than the fuel flow rate of said supply pump so that during operation of the system fuel completely fills the canister, wire means connecting the high-pressure pump to a power source; an unregulated fuel return line, connected respectively to the fuel tank and the canister, that delivers fuel which is in excess of the canister's fuel containing capacity back to the fuel tank;

a filter member mounted within said canister so as to filter the fuel drawn to the fuel uptake means in said high-pressure pump;

a third fuel delivery conduit connected to said outlet port in the canister, for delivering fuel pumped by said high-pressure pump to the engine;

an engine excess fuel return line connecting the engine and said canister; and a pressure regulator operatively connected to said engine excess fuel return line which returns unburned fuel from the engine to the canister.

2. A fuel control system as defined in claim 1 wherein the filter member filters particulate matter, and separates water, from fuel in the canister which is drawn to the said fuel uptake means.

3. A fuel control system as defined in claim 2, wherein the high pressure pump has top, bottom and side portions and the filter member surrounds, but is spaced from, the side portion of the high-pressure pump.

4. A fuel control system as defined in claim 1 wherein said top portion is removably secured to the canister and the second fuel delivery conduit, unregulated fuel return line, third fuel delivery conduit, engine excess fuel return line, and wire means are all connected to outlets in said top portion of the canister.

5. The fuel supply system of claim 1 wherein the unregulated fuel return line allows the low pressure, high volume supply pump to be vented to atmospheric pressure.

6. The fuel supply system of claim 1 wherein the canister is constantly supplied with fuel when in operation.

7. A fuel control device for use in an engine fuel delivery system including, in part, a low pressure supply pump having a fuel flow rate connected to a fuel tank by a fuel supply conduit, said fuel control device, comprising:

a canister having a generally closed structure but have a first inlet port connectable to said fuel supply conduit;

a high-pressure pump located within the canister, including wire means allowing the high-pressure pump to be connected to an exterior power source, and having a fuel flow rate which is lower than the full flow rate of said supply pump so that during operation fuel fills the canister;

a filter element surrounding the high-pressure pump within the canister which removes particulate matter and water from fuel drawn to an intake means in said high-pressure pump;

a first outlet port, in fluid flow communication with fuel when contained within the canister, and connectable to an unregulated fuel return conduit that delivers fuel which is beyond the volume capacity of the canister back to the fuel tank;

a second outlet port in the canister which is connectable to means for delivering fuel to the engine; and a second inlet port operatively connectable to a conduit for returning unburned fuel from the engine to the canister.

8. A fuel control device as defined in claim 7, wherein the high-pressure pump has top, bottom and side portions, and the filter element surrounds, but is spaced from, the side portion of the high-pressure pump.

9. A fuel control device as defined in claim 7 wherein said top portion is removably secured to the canister and the second fuel delivery conduit, unregulated fuel return line, third fuel delivery conduit, engine excess fuel return line, and wire means are all connected to outlets in said top portion of the canister.

10. A method for controlling the fuel supply to an engine, comprising the steps of:

(a) drawing fuel from a fuel tank by a supply pump having a predetermined flow rate;

(b) delivering the fuel drawn in step (a) to a canister so that fuel fills the canister during operation;

(c) pumping fuel from the canister to an engine by means of a high-pressure pump, whose flow rate is lower than that of the supply pump;

(d) filtering particulate matter and water from the fuel delivered to the canister in step (b);

(e) returning the excess flow of fuel and fuel vapor in the canister to the fuel tank through a return line;

(f) returning excess unburned fuel from the engine to the canister.

11. A fuel control system according to claim 1, wherein said canister further comprises a water trap basin, which traps water accumulated is said canister.

12. A fuel control system according to claim 11, wherein said water trap basin comprises a drain plug, which releasably drains water from said water trap basin.

13. A fuel control system according to claim 1, wherein said fuel tank return line communicates fuel vapor to the fuel tank for venting.

* * * * *